US011704002B2

(12) United States Patent
Wang et al.

(10) Patent No.: US 11,704,002 B2
(45) Date of Patent: Jul. 18, 2023

(54) MUSIC-FOCUSED PRESENTATION METHOD

(71) Applicant: LEMON INC., Grand Cayman (KY)

(72) Inventors: Fernando Wang, Culver City, CA (US); Michael Buzinover, Culver City, CA (US); Jialiang Zhang, Culver City, CA (US); Ning Li, Beijing (CN)

(73) Assignee: LEMON INC., Grand Cayman (KY)

( * ) Notice: Subject to any disclaimer, the term of this patent is extended or adjusted under 35 U.S.C. 154(b) by 3 days.

(21) Appl. No.: 17/169,923

(22) Filed: Feb. 8, 2021

(65) Prior Publication Data

US 2022/0253184 A1 Aug. 11, 2022

(51) Int. Cl.
| | |
|---|---|
| *G06F 3/0484* | (2022.01) |
| *G06F 3/0482* | (2013.01) |
| *G06F 16/638* | (2019.01) |
| *G06F 3/16* | (2006.01) |
| *G11B 27/031* | (2006.01) |

(52) U.S. Cl.
CPC .......... *G06F 3/0484* (2013.01); *G06F 3/0482* (2013.01); *G06F 3/165* (2013.01); *G06F 16/638* (2019.01); *G11B 27/031* (2013.01)

(58) Field of Classification Search
CPC .............. G06Q 50/01; G06F 3/048; G06F 3/0484–0486; G06F 3/0482; G06F 16/60–687; G06F 16/638–639; G06F 3/165; G06F 3/0488–04886; G11B 27/031–038
See application file for complete search history.

(56) References Cited

U.S. PATENT DOCUMENTS

| | | | | |
|---|---|---|---|---|
| 9,880,730 | B2 * | 1/2018 | Darby | G06F 3/04886 |
| 2006/0085751 | A1 * | 4/2006 | O'Brien | G06F 3/0481 |
| | | | | 715/727 |
| 2012/0254910 | A1 * | 10/2012 | Donoghue | H04N 21/431 |
| | | | | 725/14 |
| 2013/0047084 | A1 | 2/2013 | Sanders et al. | |
| 2013/0275506 | A1 * | 10/2013 | Warner | G06Q 10/10 |
| | | | | 709/204 |
| 2015/0106444 | A1 | 4/2015 | Schneider et al. | |

(Continued)

OTHER PUBLICATIONS

Review Information. "How to Search Music / Song on TikTok". Mar. 14, 2019. Youtube. https://www.youtube.com/watch?v=T3mUhqQ8itQ (Year: 2019).*

(Continued)

*Primary Examiner* — Liang Y Li
(74) *Attorney, Agent, or Firm* — BakerHostetler

(57) ABSTRACT

A plurality of music samples and a plurality of images corresponding to the music samples may be stored in a database. The plurality of music samples may be sorted in an order of priority. Information associated with the plurality music samples may be sent to a user device. The user device may display the plurality of images corresponding to the plurality of music samples in the order of priority. The user device may receive information indicative of at least one video associated with a music sample in response to receiving user input indicative of a selection of an image among the plurality of images. The user device may display at least one sample video image corresponding to the at least one video associated with the music sample.

17 Claims, 8 Drawing Sheets

(56) References Cited

U.S. PATENT DOCUMENTS

| | | |
|---|---|---|
| 2017/0177572 A1 | 6/2017 | Ross et al. |
| 2017/0262253 A1* | 9/2017 | Silva ........................ G09G 5/02 |
| 2020/0142550 A1 | 5/2020 | Rivera et al. |
| 2020/0326792 A1 | 10/2020 | Beaumier et al. |
| 2020/0380029 A1* | 12/2020 | Chen ..................... G06F 16/685 |

OTHER PUBLICATIONS

Garcia, Laura. "Ultimate beginner's guide on how to monitor content on TikTok". Oct. 29, 2020. Firstdraftnews. https://firstdraftnews.org/long-form-article/ultimate-beginners-guide-on-how-to-monitor-content-on-tiktok/ (Year: 2020).*

Lamouri, Mounir. "Unified Autoplay". Sep. 14, 2017. https://blog.chromium.org/2017/09/unified-autoplay.html; https://sites.google.com/a/chromium.org/dev/audio-video/autoplay (Year: 2017).*

International Patent Application No. PCT/SG2022/050041; Int'l Search Report; dated Apr. 13, 2022; 4 pages.

\* cited by examiner

MUSIC-FOCUSED PRESENTATION METHOD

BACKGROUND

Communication is increasingly being conducted using Internet-based tools. The Internet-based tools may be any software or platform. Existing social media platforms enable users to communicate with each other by sharing images, videos, and other information via static app or web pages. As communication devices, such as mobile phones, become more sophisticated, people continue to desire new ways for social networking and communication.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION OF ILLUSTRATIVE EMBODIMENTS

Existing social media platforms enable users to communicate with each other by sharing images and videos and viewing images and videos shared by other users. For example, a user of a social media platform, may upload a short video to the social media platform so that other users of the social media platform may view the short video. Viewing the short video may inspire the other users to create their own short videos. For example, if the short video featured the user doing a particular dance, the other users may feel inspired to create their own short videos based on that dance. As another example, if the short video was associated with a particular hashtag, the other users may feel inspired to create their own short videos associated with that hashtag.

As more users of a social media platform become inspired to create content, the user-experience of the social platform may improve. By creating their own content, users may feel more engaged with the other users of the social media platform. Additionally, more content may be available for the users of the social media platform to consume. Accordingly, it may be desirable to find new ways to inspire users of a social media platform to create content.

Users of a social media platform may feel inspired to create content if they view content that features a song. For example, if a user of the social media platform views a short video featuring a song that appeals to the user, the user may want to create a new short video featuring that song. The user may feel particularly inspired to create content featuring a song if they view a large quantity of content that features that same song or if the song is popular among users. The user may be able to see how the other users of the social media platform have incorporated that song into their content and may want to create new content that incorporates the song in similar ways. For example, if the user notices that a significant number of other users of the social media platform are creating short videos of them dancing to the song, then the user may feel inspired to create a short video of the user dancing to the same song. Accordingly, if the user is able to search the social media platform for content that features a certain song, this may increase the likelihood that the user will feel inspired to create content.

Figure 1:
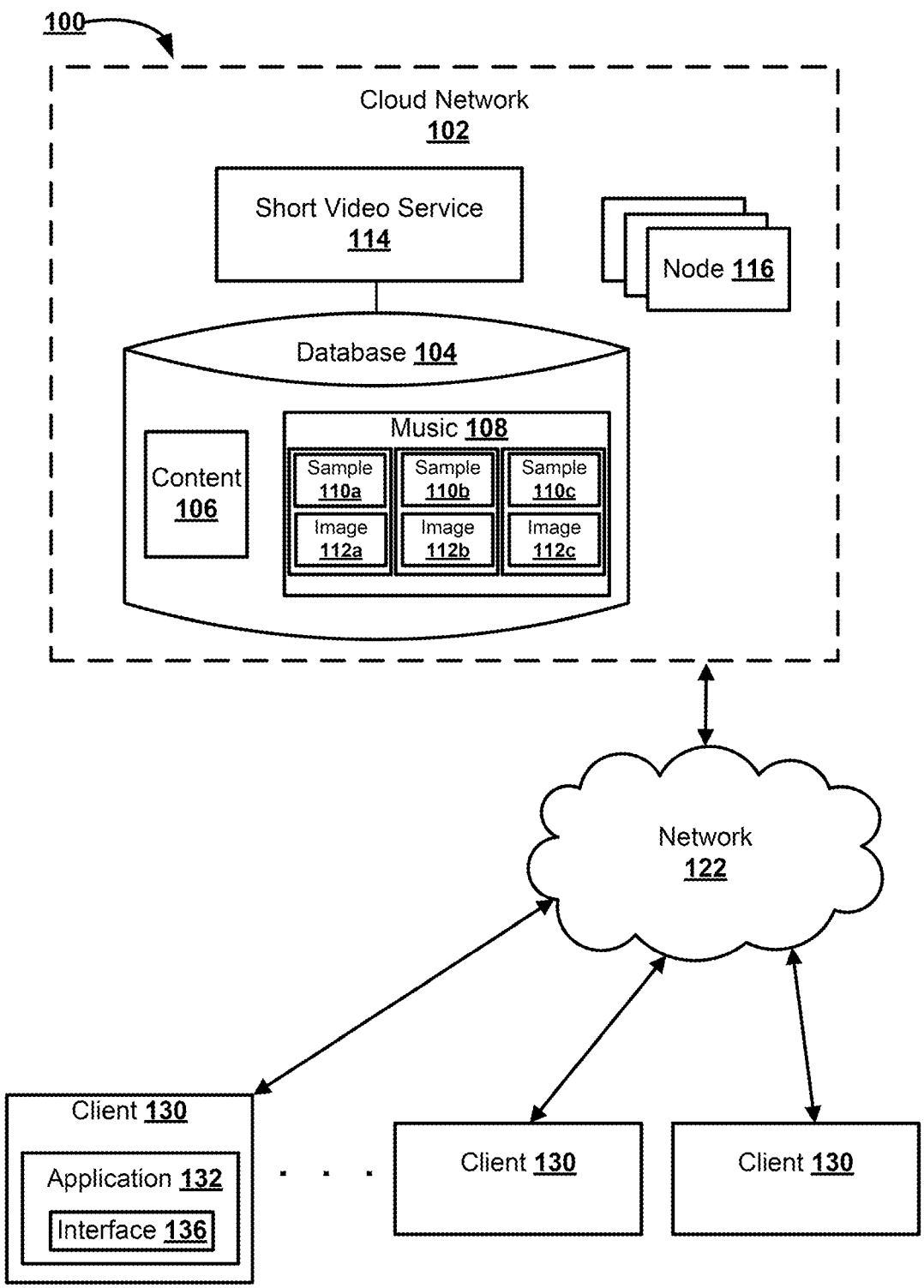
FIG. 1 shows an example system for distributing content.

FIG. 1 illustrates an example system 100 for distributing content. The system 100 may comprise a cloud network 102 and a plurality of client devices 130. The cloud network 102 and the plurality of client devices 130 may communicate with each other via one or more networks 122.

The cloud network 102 may be located at a data center, such as a single premise, or be distributed throughout different geographic locations (e.g., at several premises). The cloud network 102 may provide the services via the one or more networks 122. The network 122 comprise a variety of network devices, such as routers, switches, multiplexers, hubs, modems, bridges, repeaters, firewalls, proxy devices, and/or the like. The network 122 may comprise physical links, such as coaxial cable links, twisted pair cable links, fiber optic links, a combination thereof, and/or the like. The network 122 may comprise wireless links, such as cellular links, satellite links, Wi-Fi links and/or the like.

The cloud network 102 may comprise a plurality of computing nodes 116 that host a variety of services. In an embodiment, the nodes 116 host a short video service 114. The nodes 116 may process tasks associated with the short video service 114. The plurality of computing nodes 116 may be implemented as one or more computing devices, one or more processors, one or more virtual computing instances, a combination thereof, and/or the like. The plurality of computing nodes 116 may be implemented by one or more computing devices. The one or more computing devices may comprise virtualized computing instances. The virtualized computing instances may comprise a virtual machine, such as an emulation of a computer system, operating system, server, and/or the like. A virtual machine may be loaded by a computing device based on a virtual image and/or other data defining specific software (e.g., operating systems, specialized applications, servers) for emulation. Different virtual machines may be loaded and/or terminated on the one or more computing devices as the demand for different types of processing services changes. A hypervisor may be implemented to manage the use of different virtual machines on the same computing device.

The short video service 114 may comprise a content streaming service, such as an Internet protocol video streaming service. For example, the short video service 114 may comprise a video sharing service, a video hosting platform, a content distribution platform, a collaborative gaming platform, and/or the like. The short video service 114 may be configured to distribute content 106, such as video, audio, textual data, a combination thereof, and/or the like, via a variety of transmission techniques. The content 106 may comprise content streams (e.g., video stream, audio stream, information stream), content files (e.g., video file, audio file, text file), and/or other data. The content 106 may be stored in a database 104.

In an embodiment, the content 106 provided by the short video service 114 comprises short videos. The short videos may have a duration less than or equal to a predetermined time limit, such as one minute, five minutes, or other predetermined minutes. By way of example and without limitation, the short videos may comprise at least one, but no more than four, 15 second segments strung together. The short duration of the videos may provide viewers with quick bursts of entertainment that allow users to watch a large quantity of videos in a short time frame. Such quick bursts of entertainment may be popular on social media platforms. Some or all of the short videos may comprise a pre-recorded audio overlay, such as music or audio from a television show or movie. If a short video comprises a pre-recorded audio overlay, the short video may feature one or more individuals lip-syncing or dancing to the pre-recorded audio. For example, a short video may feature an individual completing a "dance challenge" to a popular song or a short video may feature two individuals participating in a lip-syncing or dancing duet. Other short videos may not comprise a pre-recorded audio overlay. For example, these short videos may feature an individual playing sports, pulling pranks, or giving advice, such as beauty and fashion advice, cooking tips, or home renovation tips.

The short videos provided by the short video service 114 may each correspond to a sample video image. The sample video image for a particular short video may be a frame taken from the short video. For example, the frame may be selected by a user that created the short video and uploaded it to the short video service 114, or the frame may be selected by the short video service 114. The frame selected by either the creator or the short video service 114 may be one that is representative of the subject matter of that short video or one that is likely to increase user interest in the short video.

The short video service 114 may be configured to sort at least a subset of the short videos into an order of priority. The order of priority may indicate a popularity associated with each of the short videos amongst users of the content application 132. For example, the order of priority may indicate how much user feedback each of the short videos have received. If the order of priority indicates a popularity associated with each of the short videos, the short video that has received the most user feedback or the most views may be first in the order of priority. User feedback may include, for example, comments or "likes." The order of priority may indicate a date of creation associated with each of the short videos. If the order of priority indicates date of creation associated with each of the short videos, a date of the video that has been created the most recently may be first in the order of priority. The order of priority may be user specific. For example, the order of priority may depend on the user that the short video service 114 is outputting short videos to. The short video created by a user that interacts most frequently with the user that the short video service 114 is outputting short videos to may be first in the order of priority.

The short video service 114 may be configured to distribute music, such as the music 108, via a variety of transmission techniques. The music 108 may comprise content streams (e.g., video stream, audio stream, information stream), content files (e.g., video file, audio file, text file), and/or other data. The music 108 may be stored in the database 104. The music 108 may include clips of pre-recorded music, such as the music samples 110*a-c*. The music samples 110*a-c* may be audio clips taken from various songs by various artists. For example, the artists may be popular musical artists or may be less-well known "upcoming" musical artists. The songs may be associated with any genre, including one or more of pop, hip-hop and rap, rock, dance and electronic, Latin, indie and alternative rock, classical music, or K-pop. The music samples 110*a-c* may be of any duration. For example, some or all of the music samples 110*a-c* may be ten, twenty, or thirty second clips taken from various songs. Additionally, or alternatively, some or all of the music samples 110*a-c* may be longer clips, such as one-minute clips taken from various songs. In another example, some or all of the music samples 110*a-c* may include the entire songs, respectively. The music samples 110*a-c* may feature one or more of the most popular portions of various songs. For example, a music sample associated with a particular song may feature the chorus or the "catchiest" portion of that particular song. More than one of the music samples 110*a-c* may be clips taken from the same song, or all of the music samples 110*a-c* may be clips taken from different songs.

In an embodiment, the music 108 includes images, such as the images 112*a-c*, associated with each of the music samples 110*a-c*, respectively. Each music sample 110*a-c* may be associated with one of the images 112*a-c*. For example, the music sample 110*a* may be associated with the image 112*a*, the music samples 110*b* may be associated with the image 112*b*, and the music sample 110*c* may be associated with the image 112*c*. The image associated with a particular music sample may be indicative of information associated with the song that the music sample was taken from or may be indicative of information associated with the artist that created the song from which the music sample was taken. For example, the image associated with a particular music sample may include an album cover associated with an album that includes the song that the music sample was taken from. The image may alternatively include an image, such as a drawing or photo, of the artist that created the song from which the music sample was taken.

As described above, a short video may comprise a pre-recorded audio overlay. If a short video comprises a pre-recorded audio overlay, the pre-recorded audio overlay may include one or more music samples 110*a-c*. If a short video comprises a pre-recorded audio overlay including a music samples 110*a-c*, the short video service 114 may be configured to distribute the short video and the music sample 110*a-c* simultaneously.

The short video service 114 may be configured to sort music samples, such as the music samples 110*a-c*. For example, the short video service may be configured to sort music samples into an order of priority. The order of priority may indicate a popularity associated with each of the music samples amongst users of the content application 132. For example, the order of priority may indicate how many user-generated short videos have featured each of the music samples within a particular time period, such as the last day, last two days, or last week. To sort the plurality of music samples into the order of priority, the short video service 114 may determine a popularity associated with each of the music samples, and rank, from a highest popularity to a lowest popularity, each of the plurality of music samples. For example, the music sample having the greatest popularity may be ranked "one" in the order of priority. Any number of music samples may be included in the order of priority, with each music sample being more popular than the remainder of music samples that follow. It should be appreciated that the order of priority may be based on other aspects of the music samples.

In an embodiment, the content 106 and the music 108 may be output to different client devices 130 via the network 122. The content 106 and the music 108 may be streamed to the client devices 130. The content stream may be a stream of short videos received from the short video service 114. The music 108 may be featured in the content 108 streamed to the client devices 130, or the music 108 may be streamed to the client devices 130 separately from the content 108. The plurality of client devices 130 may be configured to access the content 106 and the music 108 from the short video service 114. In an embodiment, a client device 130 may comprise a content application 132. The content application 132 outputs (e.g., display, render, present) the content 106 and the music 108 to a user associated with the client device 130. The content may comprise videos, audio, comments, textual data and/or the like.

The plurality of client devices 130 may comprise any type of computing device, such as a mobile device, a tablet device, laptop, a desktop computer, a smart television or other smart device (e.g., smart watch, smart speaker, smart glasses, smart helmet), a gaming device, a set top box, digital streaming device, robot, and/or the like. The plurality of client devices 130 may be associated with one or more users. A single user may use one or more of the plurality of client devices 130 to access the cloud network 102. The plurality of client devices 130 may travel to a variety of locations and use different networks to access the cloud network 102.

The short video service 114 may be configured to receive input from users. The users may be registered as users of the short video service 114 and may be users of the content application 132 operating on client devices 130. The user inputs may include short videos created by users, user comments associated with short videos, or "likes" associated with short videos. In an embodiment, a user may use the content application 132 on a client device 130 to create a short video and upload the short video to the cloud network 102. The client device 130 may access an interface 136 of the content application 132. The interface 136 may comprise an input element. For example, the input element may be configured to allow users to create the short video. To create the short video, the user may give the content application 132 permission to access a camera or a microphone of the client device 130. Using the content application 132, the user may select a duration for the short video or set a speed for the short video, such as "slow-motion" or "speed things up."

The user may edit the short video using the content application 132. The user may add one or more texts, filters, sounds, or effects, such as beauty effects, to the short video. To add a pre-recorded audio overlay to the short video, the user may select music sample 110a-c from a sound library of the content application 132. The sound library may include any number of music samples, entire songs, sound effects, or audio clips from movies, albums, and television shows. If the sound library includes music samples, the sound library may list the music samples in an order of priority. For example, the sound library may list the music samples in an array or list, with the most popular music sample at the first position in the array or list. A particular music sample may be the "most popular" music sample if it has been added to the greatest number of short videos by other users of the content application 132. A music sample may be added to the greatest number of short videos by other users of the content application 132 if that music sample is featured in a trending "challenge" amongst the users of the content application 132.

In addition to or in lieu of adding a pre-recorded audio overlay to the short video, the user may use the content application 132 to add a voice-over to the short video. The voice-over may be a sound recorded by the user using a microphone of the client device 130. The user can add a text overlay to the short video and may use the content application 132 to specify when they want the text overlay to appear in the short video. The user may assign a caption, location tag, and one or more hashtags to the short video to indicate the subject matter of the short video. The content application 132 may prompt the user to select a frame of the short video to use as a "sample video image" for the short video.

After the user has created the short video, the user may use the content application 132 to upload the short video to the cloud network 102 and/or to save the short video locally to the user device 130. When a user uploads the short video to the cloud network 102, they may choose whether they want the short video to be viewable by all other users of the content application 132 or viewable by only a subset of the users of the content application 132. The short video service 114 may store the uploaded short videos and any metadata associated with the short videos in one or more databases 104. For, example, the short video service 114 may store the uploaded short videos and any associated metadata as the content 106 in one or more databases 104.

In an embodiment, a user may use the content application 132 on a client device 130 to provide input on a short video. The client devices 130 may access an interface 136 of the content application 132 that allows users to provide input associated with short videos. The interface 136 may comprise an input element. For example, the input element may be configured to receive input from a user, such as comments or "likes" associated with a particular short video. If the input is a comment, the content application 132 may allow a user to set an emoji associated with his or her input. The content application 132 may determine timing information for the input, such as when a user wrote a comment. The content application 132 may send the input and associated metadata to the cloud network 102. For example, the content application 132 may send a comment, an identifier of the user that wrote the comment, and the timing information for the comment to the cloud network 102. The short video service 114 may store the input and associated metadata in a database 104.

The short video service 114 may be configured to output the uploaded short videos and user input to other users. The users may be registered as users of the short video service 114 to view short videos created by other users. The users may be users of the content application 132 operating on client devices 130. The content application 132 may output (display, render, present) the short videos and user input to a user associated with a client device 130. The client devices 130 may access an interface 136 of the content application 132. The interface 136 may comprise an output element. The output element may be configured to display information about different short videos so that a user can select a short video to view. For example, the output element may be configured to display at least one sample video image, captions, or hashtags associated with the short videos.

In an embodiment, the user comments associated with a short video may be output to other users watching the same short video. For example, all users accessing a short video may view comments associated with the short video. The short video service 114 may output the short video and the associated comments simultaneously. Comments may be output by the short video service 114 in real-time or near-real-time. The content application 132 may display the short videos and comments in various ways on the client device 130. For example, the comments may be displayed in an overlay above the content or in an overlay beside the content. The comments may be animated when displayed. For example, the comments may be shown scrolling across the short video or across the overlay.

In an embodiment, a user may use the content application 132 on a client device 130 to listen to the music samples 110*a-c* and view the images 112*a-c* associated with the music samples 110*a-c*. As described above, the music samples 110*a-c* may be featured in one or more short videos. If a music samples 110*a-c* is featured in a short video, the user may listen to the music sample 110*a-c* by watching the short video. However, the music samples 110*a-c* may be consumed by the user without the user having to watch a short video featuring the music samples 110*a-c*.

Figure 2:
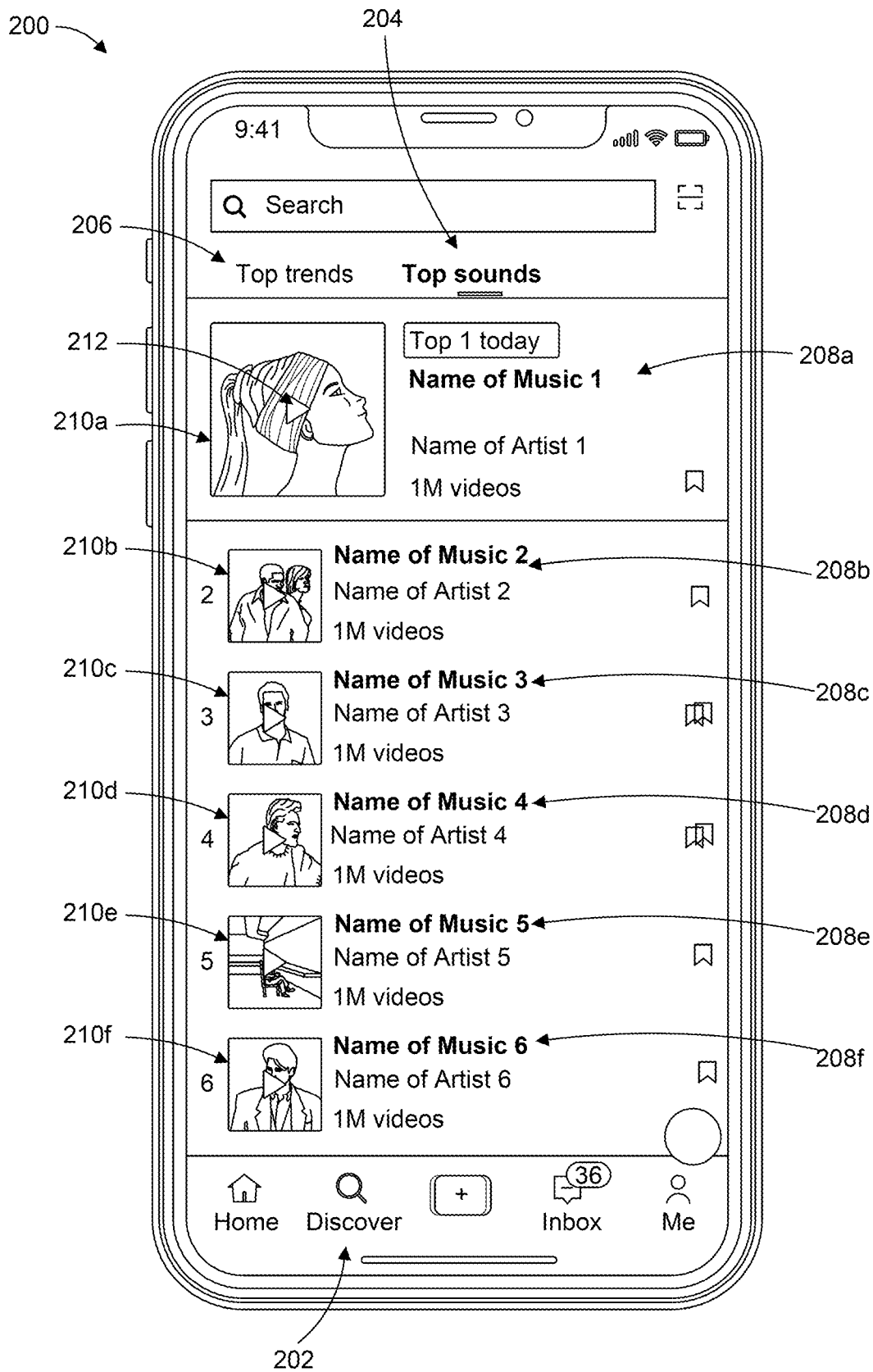
FIG. 2 shows an example user interface of a content distribution application in accordance with the present disclosure.

For example, as illustrated in FIG. 2, the user may view a list of at least a subset of the music samples, such as the music samples 208*a-f*, and at least a subset of the images, such as the images 210*a-f*, on a UI 200 of a client device 130. The subset of music samples or the subset of images may include any number of music samples and corresponding images. The user may view the music samples 208*a-f* and images 210*a-f* by selecting a button, such as a "discover" button 202, displayed on the UI 200. If the user selects the discover button 202, the UI 200 may display a page associated with a "top trends" tab 206. The page associated with the "top trends" tab 206 may display popular short videos, categorized by "trending" hashtags. For example, if a large number of users of the content application 132 have created and uploaded short videos associated with the hashtags "#election," and "#cats" then the "top trends" tab 206 may display those short videos associated with the "#election" hashtag in a first carousel and those short videos associated with the "#cats" hashtag in a second carousel. If the user is finding short videos that are associated with a particular hashtag, then the user may scroll through the carousel corresponding to that hashtag.

If the user instead wants to view or listen to music samples, the user may select the "top sounds" tab 204. The page associated with the "top sounds" tab 204 may display the list of music samples 208*a-f* and images 210*a-f*. As described above, the music samples 208*a-f* may be audio clips taken from various songs by various artists. The songs may be associated with any genre and may be of any duration. The music samples 208*a-f* may feature one or more of the most popular portions of various songs. For example, the music sample 208*a* is associated with a song, and the music sample 208*a* may feature the chorus or more popular portion associated with the song.

More than one of the music samples 208*a-f* may be clips taken from the same song, or all of the music samples 208*a-f* may be clips taken from different songs. More than one of the music samples 208*a-f* may be taken from different songs created by the same musical artist. The user may view the musical artist that created the song associated with each music sample 208*a-f* on the UI 200. In an embodiment, the musical artist may be displayed under the name of the song associated with each music sample 208*a-f*. For example, the music sample 208*b* is associated with a music, e.g., a song, and the name of the corresponding musical artist is displayed under the name of music, e.g., the song title. In one example, each of music samples 208*b-e* may be taken from different songs created by the same musical artist. In another example, each of music samples 208*b-e* may be taken from different songs created by different musical artists.

Each of the music samples 208*a-f* may correspond to one of the images 210*a-f*. For example, the music sample 208*a* may correspond to the image 210*a*, the music sample 208*b* may correspond to the image 210*b*, the music sample 208*c* may correspond to the image 210*c*, the music sample 208*d* may correspond to the image 210*d*, the music sample 208*e* may correspond to the image 210*e*, and the music sample 208*f* may correspond to the image 210*f*. As described above, the image that corresponds to a particular music sample may include an album cover for an album that includes the song that the music sample was taken from. For example, the image 210*a* may be an album cover associated with the music sample 208*a*. The image that corresponds to a particular music sample may alternatively include an image, such as a drawing or photo, of the artist that created the song from which the music sample was taken. For example, the image 210*f* may be a photograph of the artist that created the song from which the music sample 208*f* was taken.

The music samples 208*a-f* may be displayed on the UI 200 in an order of priority. The order of priority may indicate a popularity associated with each of the music samples 208*a-f* amongst users of the content application 132. For example, the order of priority may indicate how many user-generated short videos have featured each of the music samples within a particular time period, such as the last day, last two days, or last week. The music sample that has been most popular within that particular time period may be displayed at the top of the list of music samples 208*a-f*. For example, the music sample 208*a* may have been featured in more user-generated short videos within the last 24-hours than the remainder of the music samples 208*b-f*. Likewise, the music sample 208*b* may have been featured in more user-generated short videos within the last 24-hours than the remainder of the music samples 208*c-f*. Any number of music samples may be included in the list, with each music sample being more popular than the remainder of music samples that follow in the list.

As mentioned above, users of the content application 132 may create short videos that feature music samples. If the user wants to see user-generated videos that feature a particular music sample, the user may select the song name associated with that music sample. For example, if the user wants to see user-generated short videos associated with the music sample 208*a*, the user may select the song name. If the user selects the song name, the user may be re-directed to a page that features all short videos created by users of the content application 132 that feature the music sample 208*a*.

Figure 3:
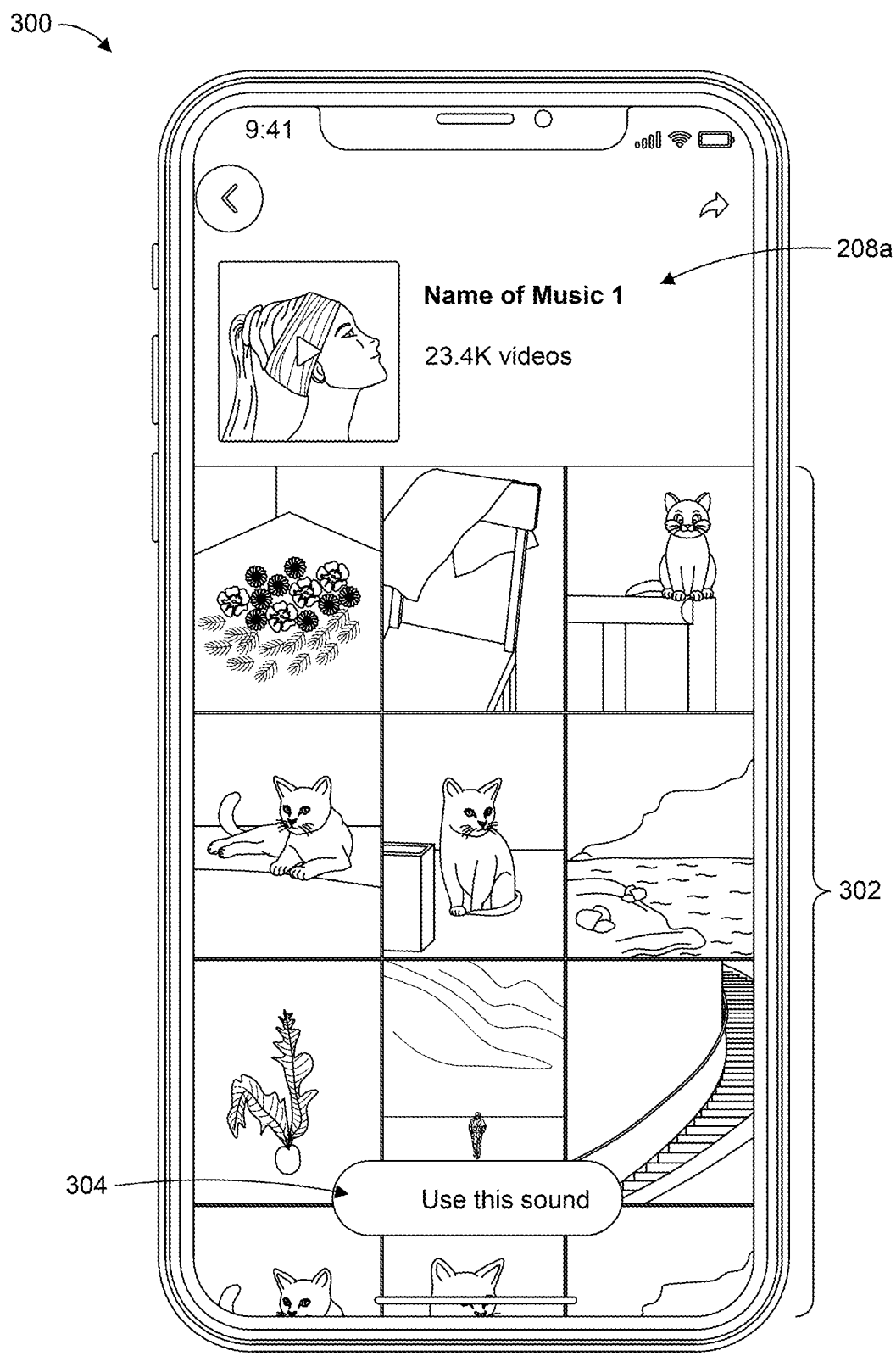
FIG. 3 shows another example user interface of a content distribution application in accordance with the present disclosure.

In an embodiment, as illustrated in FIG. 3, the user may view at least a subset of the short videos that feature the music sample 208*a*, on a UI 300 of a client device 130. Each of the short videos that feature of the music sample 208*a* may correspond to a sample video image. The sample video image corresponding to a particular short video may be indicative of the subject matter of that short video. For example, the sample video image corresponding to a particular short video may be a frame of that short video. If the sample video image corresponding to a particular short video is a frame of that short video, that frame may have been selected, at the time of creation by the user that created the short video. Alternatively, the frame may have been selected by the short video service 114. For example, the short video service 114 may select a frame from a short video to be the sample video image if that frame may increase user interest in consuming the short video. The sample video images that correspond to the short videos that feature the music sample 208a may be displayed in an array 302 on the UI 300.

Viewing the short videos that feature a particular music sample may inspire a user to create a new short video featuring that music sample. For example, viewing the short videos that feature the music sample 208a may inspire a user to create a new short video featuring the music sample 208a. If the user decides to create a new short video featuring the music sample 208a, the user may select the "use this sound" button 304 on the UI 300. By selecting the "use this sound" button 304, the user may be able to create a new short video having the music sample 208 as an audio overlay. The user may create the new short video in the manner described above. For example, the user may give the content application 132 permission to access a camera or a microphone of the client device 130. The user may select a duration for the short video or set a speed for the short video and may edit the short video, by adding texts, filters, sounds, or effects, such as beauty effects. The user may additionally be prompted to select a frame of the short video to use as a "sample image" for the short video.

Referring back to FIG. 2, the user may want to listen to a music sample displayed on the UI 200 instead of being re-directed to a different page displaying the short videos associated with the music sample. For example, the user may want to listen to the music sample 208a instead of being directed to UI 300. If the user wants to listen to a music sample, the user may select a play button associated with the desired music sample. For example, if the user wants to listen to the music sample 208a, the user may select the play button 212 associated with the music sample 208a. To select the play button 212, the user may touch the play button 212 on the UI 200. If the user selects the play button 212, playback of the portion of the song featured in the music sample 208a may be initiated.

Figure 4:
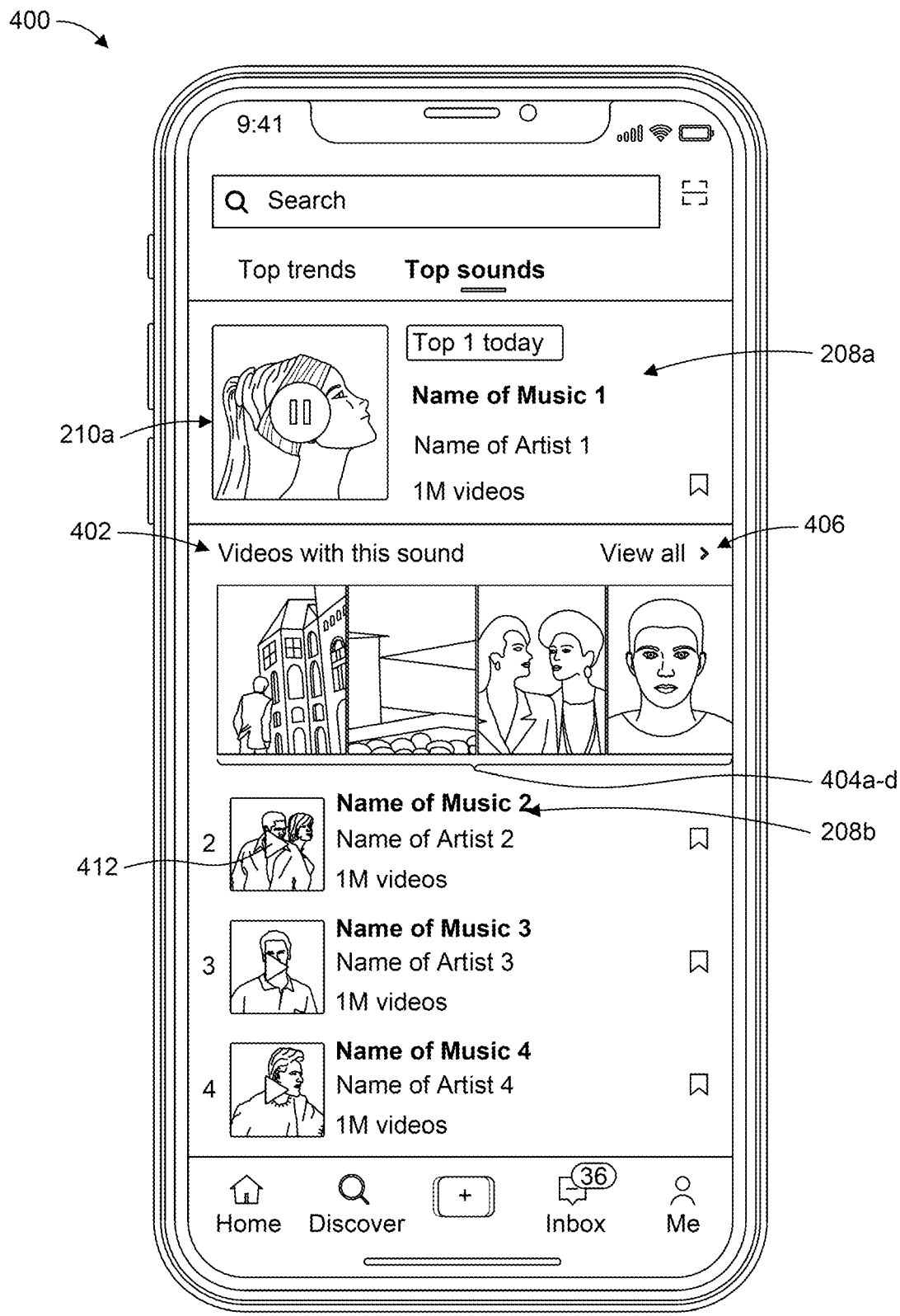
FIG. 4 shows another example user interface of a content distribution application in accordance with the present disclosure.

If the user selects the play button 212, the user may also see at least a subset of the short videos that feature the music sample 208a. In an embodiment, as illustrated in FIG. 4, the user may view a carousel 402 that features at least a subset of the short videos that feature the music sample 208a, on a UI 400 of a client device 130. As described above, each of the short videos that feature of the music sample 208a may correspond to a sample video image. The sample video image corresponding to a particular short video may be indicative of the subject matter of that short video. For example, the sample video image corresponding to a particular short video may be a frame of that short video. The sample video images 404a-d that correspond to the short videos that feature the music sample 208a may be displayed in the carousel 402 on the UI 400. The sample video images 404a-d, e.g., the carousel 402, may be displayed under the image 210a corresponding to the music sample 208a or any other suitable location on the UI 400.

The sample video images 404a-d may be arranged in the carousel 402 in an order of priority. The order of priority may be hard-coded or based on one or more of the following: a time of creation for the short video associated with each of the sample video images 404a-d, a popularity for the short video associated with each of the sample video images 404a-d, or a creator of the short video associated with each of the sample video images 404a-d. For example, the first sample video image 404a in the carousel 402 may correspond to a more popular short video than the remaining sample video images 404b-d. The short video corresponding to the sample video images 404a may be more popular than the short videos corresponding to the sample video images 404b-d if, for example, the short video corresponding to the sample video images 404a has more user feedback or more views than short videos corresponding to the sample video images 404b-d. As another example, the first sample video image 404a in the carousel 402 may correspond to a more recently created short video than the remaining sample video images 404b-d. As another example, the sample video images 404a may be listed in an order based on recommendations for the user of the client device 130. For example, the user of the client device 130 may be most likely to be interested in the first sample video image 404a in the carousel 402. The user of the client device 130 may be more interested in short videos created by other users that the user of the client device 130 interacts with frequently.

If the user selects the play button 212 as shown in FIG. 2, the user may view the carousel 402 while playback of the music sample 208a continues. The user may be able to browse through the sample video images 404a-d in the carousel 402 while listening to the music sample 208a. When playback of the music sample 208a ends, the user may still be able to browse through the sample images 404a-d in the carousel 402. If one of the sample images 404a-d appeals to the user, the user may select the sample image and playback of the short video corresponding to the sample image may begin. The user may click the play button 212 again to restart playback of the music sample 208a, or playback of the music sample 208a may be automatically restart.

Viewing the sample images 404a-d while listening to the music sample 208a may inspire a user to create a new short video featuring the music sample 208a. If the user decides to create a new short video featuring the music sample 208a, the user may select the "view all" button 406 on the UI 400. By selecting the "view all" button 406, the user may be re-directed to the UI 300, where the user may be able to select the "use this sound" button 304 to create a new short video having the music sample 208 as an audio overlay, in the manner described above. In addition to inspiring creation, allowing the user to view the sample images 404a-d while listening to the music sample 208a may improve using experiences of the users.

Figure 5:
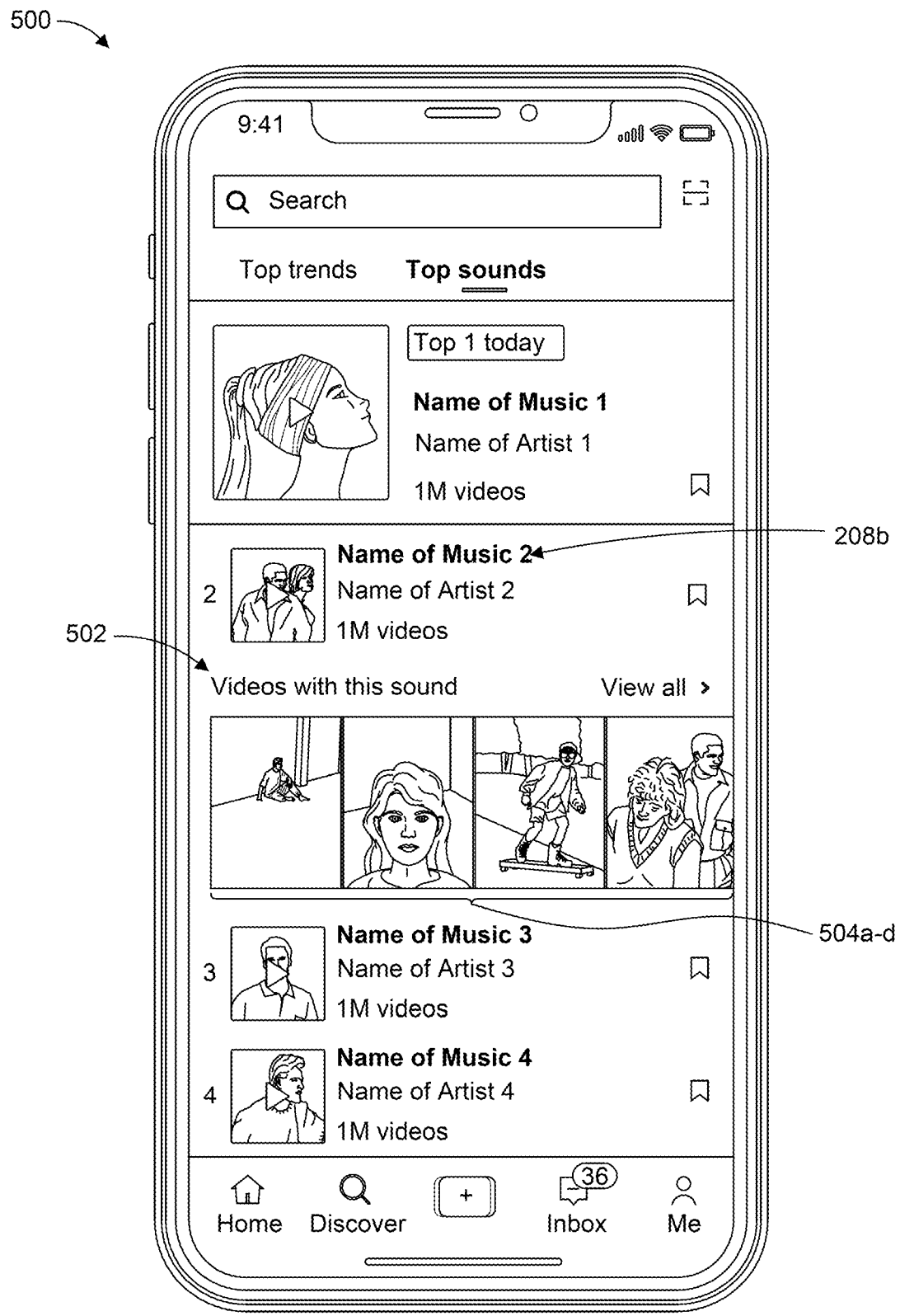
FIG. 5 shows another example user interface of a content distribution application in accordance with the present disclosure.

The user associated with the client device 300 may want to listen to a different music sample 208a-f or view a carousel including sample video images corresponding to a different music sample 208a-f. For example, after listening to the music sample 208a and browsing through the carousel 402, the user may instead want to listen to another music sample, e.g., the music sample 208b. If the user wants to listen to a different music sample, the user may select a play button associated with that different music sample. For example, the user selects a "play" button 412 associated with the music sample 208b. To select the play button 412, the user may touch the play button 412. As illustrated in FIG. 5, playback of the portion of another song featured in the music sample 208b may be initiated if the user selects the play button 412. In response to receiving a selection of the music sample 208b, the sample video images 404a-d associated with the previous music sample 208a may disappear from the user interface.

If the user selects the play button 412, the user may also see at least a subset of the short videos that feature the music sample 208b. For example, as shown in FIG. 5, the user may view a carousel 502 that features at least a subset of the short videos that feature the music sample 208b. Each of the short videos that feature the music sample 208b may correspond to a sample video image. The sample video image corresponding to a particular short video may be indicative of the subject matter of that short video. For example, the sample video image corresponding to a particular short video may be a frame of that short video. The sample video images 504*a*-*d* that correspond to the short videos that feature the music sample 208*b* may be displayed in the carousel 502 on the UI 500. The sample video images 504*a*-*d*, e.g., the carousel 502, may be displayed under the image 210*b* corresponding to the music sample 208*b* or any other suitable location on the UI 500.

The sample video images 504*a*-*d* may be arranged in the carousel 502 in an order of priority. The order of priority may be hard-coded or based on one or more of the following: a time of creation for the short video associated with each of the sample video images 504*a*-*d*, a popularity for the short video associated with each of the sample video images 504*a*-*d*, or a creator of the short video associated with each of the sample video images 504*a*-*d*. For example, the first sample video image 504*a* in the carousel 502 may correspond to a more popular short video than the remaining sample video images 504*b*-*d*. The short video corresponding to the sample video images 504*a* may be more popular than the short videos corresponding to the sample video images 504*b*-*d* if, for example, the short video corresponding to the sample video images 504*a* has more user feedback or more views than short videos corresponding to the sample video images 504*b*-*d*. As another example, the first sample video image 504*a* in the carousel 502 may correspond to a more recently created short video than the remaining sample video images 504*b*-*d*. As another example, the sample video images 504*a* may be listed in an order based on recommendations for the user of the client device 130. For example, the user of the client device 130 may be most likely to be interested in the first sample video image 504*a* in the carousel 502. The user of the client device 130 may be more interested in short videos created by other users that the user of the client device 130 interacts with frequently.

If the user selects the play button 412, the user may view the carousel 502 while playback of the music sample 208*b* continues. The user may be able to browse through the sample video images 504*a*-*d* in the carousel 502 while listening to the music sample 208*b*. When playback of the music sample 208*b* ends, the user may still be able to browse through the sample images 504*a*-*d* in the carousel 502. If one of the sample images 504*a*-*d* appeals to the user, the user may select the sample image and playback of the short video corresponding to the sample image may begin. The user may click the play button 412 again to restart playback of the music sample 208*b*, or playback of the music sample 208*b* may be automatically restart. Viewing the sample images 504*a*-*d* while listening to the music sample 208*b* may inspire a user to create a new short video featuring the music sample 208*b*. In addition to inspiring creation, allowing the user to view the sample images 504*a*-*d* while listening to the music sample 208*b* may improve using experiences of the users.

Figure 6:
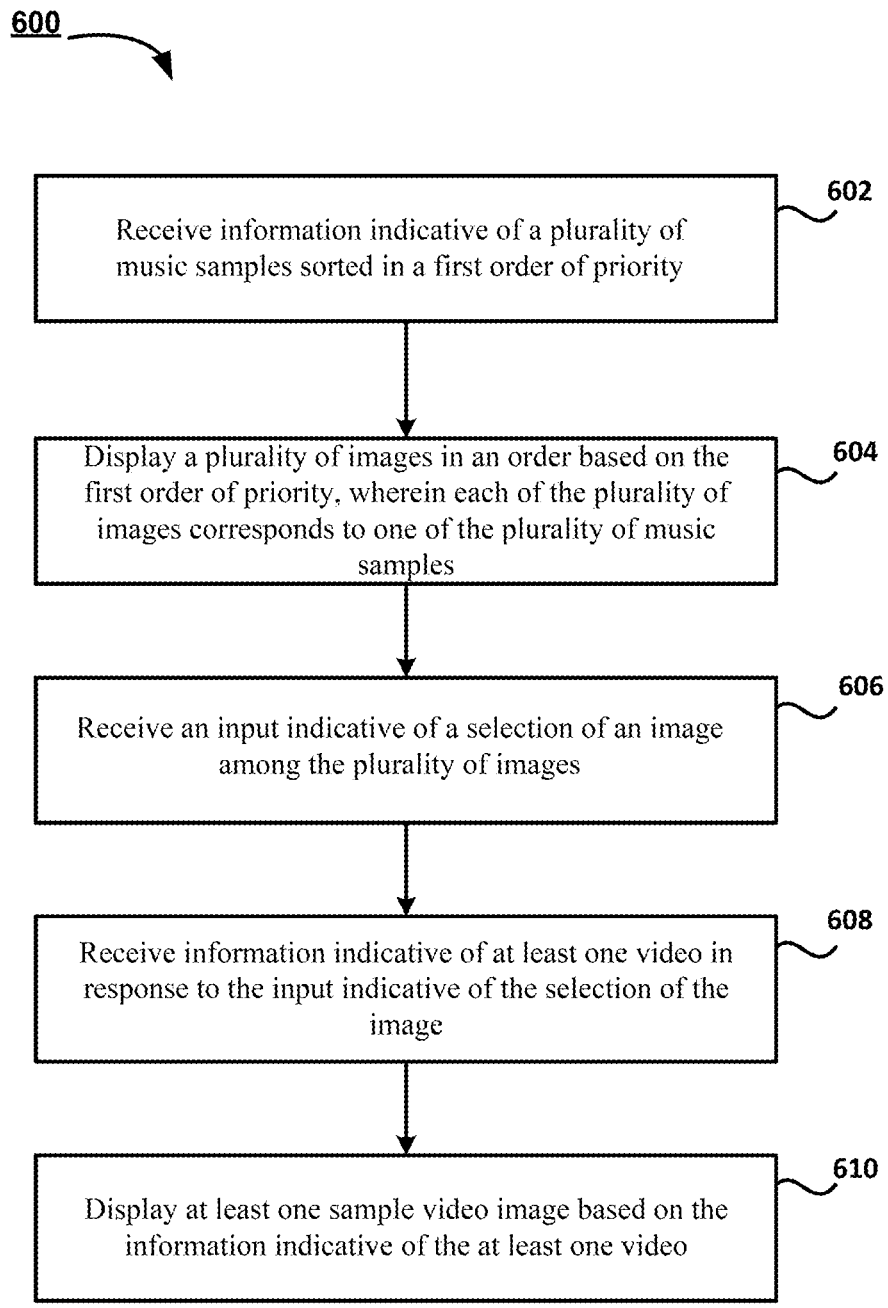
FIG. 6 shows an example method for finding content, which may be performed by a user device in accordance with the present disclosure.

As discussed above, a user associated with a client device 130 may want to find content, such as short videos, that feature a particular music sample, such as one of the music samples 110*a*-*b* of FIG. 1 or one of the music samples 208*a*-*f* of FIG. 2. By searching for short videos based on music featured in the short videos, the user may feel inspired to create one or more additional videos that feature a particular music sample. For example, after viewing how other users have chosen to incorporate a particular music sample into a variety of short videos, the user may feel inspired to create a new short video that incorporates the music sample in a similar way. FIG. 6 illustrates an example process 600 performed by a user device (e.g. client device 130). The user device may perform the process 600 to find content, such as short videos made by other users, based on music. Although depicted as a sequence of operations in FIG. 6, those of ordinary skill in the art will appreciate that various embodiments may add, remove, reorder, or modify the depicted operations.

A user associated with the user device may be a user of the content application 132. The user may want to search for short videos based on music samples featured in the short videos. At 602, information indicative of a plurality of music samples may be received. The information indicative of the plurality of music samples may be received, for example, from the cloud network 102 of FIG. 1. The music samples may be sorted in a first order of priority, and the information indicative of the plurality of music samples may indicate this first order of priority. As discussed above, the first order of priority may indicate a popularity associated with each of the music samples amongst users of the content application 132. For example, the order of priority may indicate how many user-generated short videos have featured each of the music samples within a particular time period, such as the last day, last two days, or last week. The plurality of music samples that are received may include, for example, the music samples 208*a*-*f* of FIG. 2.

Each of the plurality of received music samples may correspond to an image. For example, as discussed above, each of the plurality of music samples may correspond to an image indicative of information associated with the song that the music sample was taken from or may be indicative of information associated with the artist that created the song from which the music sample was taken. For example, the image associated with a particular music sample may include an album cover associated with an album that includes the song that the music sample was taken from. The image may alternatively include an image, such as a drawing or photo, of the artist that created the song from which the music sample was taken.

At 604, a plurality of images corresponding to the received music samples may be displayed. The plurality of images may be displayed on an interface of the user device. The plurality of images corresponding to the music samples may be displayed in a list, such as the list depicted in FIG. 2, and may be displayed in an order based on the first order of priority. If a song from which a music sample was taken came first in the first order of priority, then the image corresponding to that music sample may be displayed first in the list. For example, referring to FIG. 2, the song featured in the music sample 208*a* may have been first in the first order of priority, so the image 210*a* that corresponds to the music sample 208*a* may be displayed first in the list of images. Accordingly, the plurality of images may be displayed in an order indicative of the popularity associated with each of the corresponding music samples amongst users of the content application 132.

The user associated with the user device may want to view user-generated videos that feature a particular music sample. For example, referring to FIG. 2, the user may want to see user-generated short videos that feature the music sample 208*a*. If the user wants to see user-generated short videos that feature a particular music sample, the user may select the image corresponding to that music sample. For example, if the user wants to see short videos that feature the music sample 208*a*, the user may select the image 210*a*. To select an image, the user may touch an interface of the user device. At 606, an input indicative of a selection of an image among the plurality of images may be received. Receiving the input may, for example, comprise determining that the user has selected the image.

In an embodiment, the user may select the image by selecting a "play" button associated with the image. As described above, selecting a "play" button associated with an image may initiate playback of the music sample corresponding to the image. For example, the user may select the image 210a by selecting the "play" button 212. If the user selects the image by selecting a "play" button associated with the image, receiving the input indicative of the selection of the image may comprise receiving an instruction to cause playback of the music sample corresponding to the image. If receiving the input indicative of the selection of the image comprises receiving an instruction to cause playback of the music sample corresponding to the image, playback of the music sample may be initiated.

The user may want to view short videos that feature the music sample corresponding to the selected image. At 608, information indicative of at least one at least one video may be received, in response to the input indicative of the selection of the image. The at least one video may include those short videos that feature at least a portion of the music sample corresponding to the selected image. For example, the at least one video may include short videos that users of the content application 132 have created and uploaded to the short video service 114. Each of the at least one video may include at least a portion of the music sample as an audio overlay.

The information indicative of the at least one video may include a second order of priority associated with the at least one video. For example, the second order of priority may indicate one or more of a popularity, a date of creation, or a creator associated with each of the at least one video. If the second order of priority indicates a popularity associated with each of the at least one video, the video that has received the most user feedback or the most views may be first in the second order of priority. If the second order of priority indicates a date of creation associated with each of the at least one video, the video that has been created the most recently may be first in the second order of priority. If the second order of priority indicates a creator associated with each of the at least one video, the video created by a user that interacts most frequently with the user may be first in the second order of priority.

Each of the at least one video may correspond to a sample video image. For example, the sample video image corresponding to a particular video may comprise a frame taken from that video. The frame may have been selected at the time of creation by the user that created the short video. Alternatively, the frame may have been selected by the short video service 114. For example, the short video service 114 may select a frame from a short video to be the sample video image if that frame may increase user interest in consuming the short video. At 610, at least one sample video image may be displayed. For example, a frame taken from each of the at least one video may be displayed. The at least one sample video image may be displayed on an interface of the user device, such as the same interface on which the plurality of images corresponding to the plurality of music samples are displayed.

In an embodiment, the at least one video comprises a plurality of videos and the at least one sample video image comprises a plurality of sample video images. The plurality of sample video images may be displayed in an array, such as the array 302 depicted in FIG. 3. The plurality of sample video images may be displayed in the array in an order based on the second order of priority. For example, if a short video from which a sample video image was taken came first in the second order of priority, then that sample video image may be displayed first in the array. In another embodiment, the plurality of sample video images may be displayed in a carousel, such as the carousel 402 depicted in FIG. 4. The plurality of sample video images may be displayed in the carousel in an order based on the second order of priority. For example, if a short video from which a sample video image was taken came first in the second order of priority, then that sample video image may be displayed first in the carousel.

If the plurality of sample video images are displayed in a carousel, the plurality of sample video images may be displayed while playback of the music sample corresponding to the image continues. The user associated with the user device may be able to traverse through the plurality of sample video images in the carousel while listening to the music sample. Viewing the sample video images while listening to the music sample may inspire the user to create a new short video featuring the music sample. In addition to inspiring creation, allowing the user to view the sample video images while listening to the music sample may improve using experiences of the users.

Figure 7:
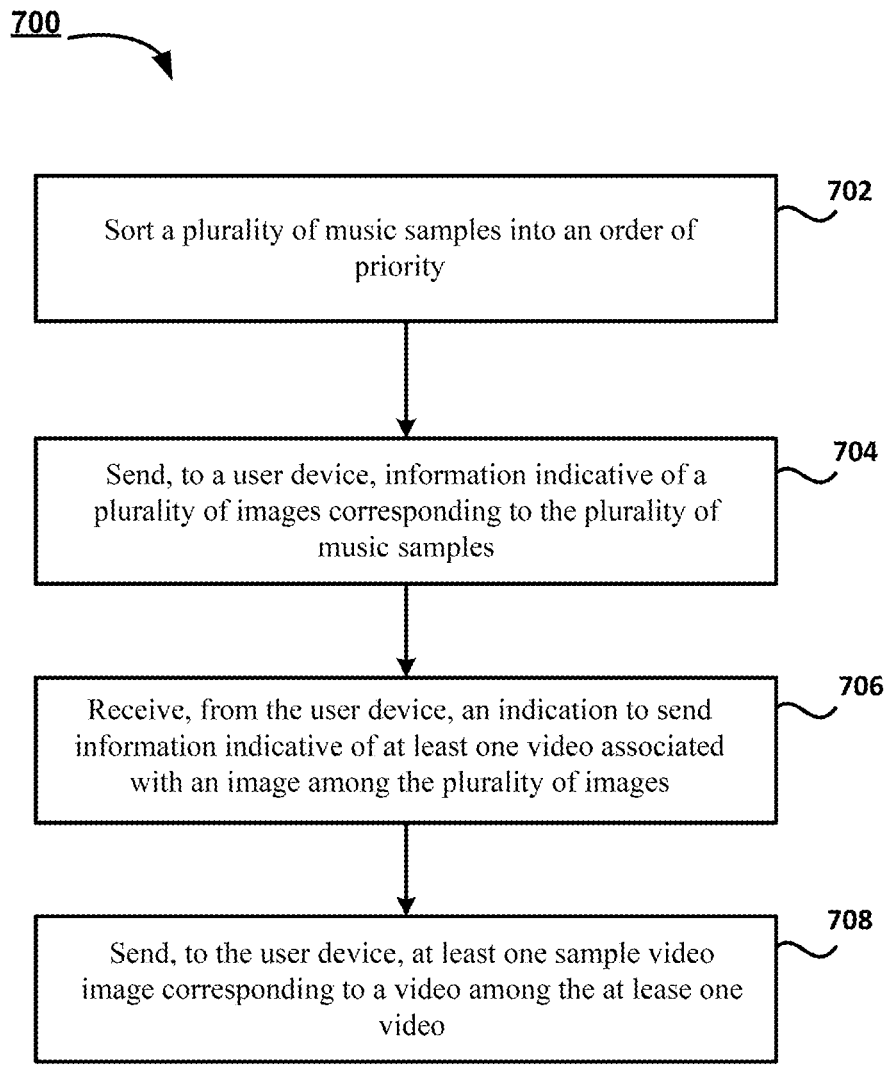
FIG. 7 shows an example method for distributing content, which may be performed by a cloud network in accordance with the present disclosure.

As discussed above, a short video service, such as the short video service 114, may want to distribute content, such as short videos, in a manner that encourages content creation and user retention. For example, a short video service may want to distribute content in such a way so that users of the short video service are able to search for short videos based on music featured in those videos. If a user is able to search for videos based on music featured in the short videos, the user may feel inspired to create one or more additional videos that feature a particular music sample or the user may spend more time using a content application 132 associated with the short video service 114. FIG. 7 illustrates an example process 700 performed by a cloud network (e.g. cloud network 102). The user device may perform the process 700 to distribute content, such as music and user-generated short videos. Although depicted as a sequence of operations in FIG. 7, those of ordinary skill in the art will appreciate that various embodiments may add, remove, reorder, or modify the depicted operations.

Users of the short video service may add audio overlays to the short videos that they create and upload to the short video service. These audio overlays may include, for example, clips of various songs. Certain song clips may be more popular with users of the short video service. For example, a particular song clip may be featured in a trending "challenge" on the short video service. If a song clip is featured in a trending "challenge" on the short video service, a large number of users may have chosen to add the song clip as an audio overlay to their short videos.

At 702, a plurality of music samples may be sorted into a first order of priority. As described above, the short video service 114 may be configured to sort a plurality of music samples into an order of priority. The plurality of music samples may include music samples included in a sound library of the content application 132. The order of priority may indicate a popularity associated with each of the music samples amongst users of the content application 132. For example, the order of priority may indicate how many user-generated short videos have featured each of the music samples within a particular time period, such as the last day, last two days, or last week. The music sample that has been most popular within that particular time period may be first in the first order of priority. To sort the plurality of music samples into the first order of priority, the cloud network 102 may determine a popularity associated with each of the plurality of music samples, and rank, from a highest popularity to a lowest popularity, each of the plurality of music samples. For example, the music sample having the greatest popularity may be ranked "one" in the order of priority.

Each of the plurality of music samples may correspond to an image. For example, as discussed above, each of the plurality of music samples may correspond to an image indicative of information associated with the song that the music sample was taken from or may be indicative of information associated with the artist that created the song from which the music sample was taken. For example, the image associated with a particular music sample may include an album cover associated with an album that includes the song that the music sample was taken from. The image may alternatively include an image, such as a drawing or photo, of the artist that created the song from which the music sample was taken.

A user of the short video service may want to search for short videos based on music samples featured in the short videos. At 704, information indicative of a plurality of images corresponding to the plurality of music samples may be sent to a user device. The information indicative of the plurality of images may include the first order of priority associated with the plurality of music samples. The user device may receive the information indicative of the plurality of images and display the images in an order based on the first order of priority on an interface of the user device, such as the UI 200 shown in FIG. 2.

The user associated with the user device may view the images and select one. For example, the user may select an image if the user wants to view user-generated short videos that feature the music sample corresponding to the time. As discussed above, the user may select an image by initiating playback of the music sample corresponding to the image. At 706, an indication to send information indicative of at least one video associated with a music sample corresponding to an image among the plurality of images may be received from the user device. The image may be the image selected by the user. If the user selects the image by initiating playback of the music sample corresponding to the image, the receiving the indication to send the information indicative of the at least one video associated with the music sample may comprise determining that playback of the music sample has been initiated on the user device.

As described above, the short video service 114 may be configured to sort the at least one video associated with the image into a second order of priority. Sorting the at least one video into the second order of priority may comprise at least one of: determining a time of creation associated with each of the at least one video, determining a popularity associated with each of the at least one video, or determining a creator associated with each of the at least one video. The second order of priority may indicate one or more of a popularity, a date of creation, or a creator associated with each of the at least one video. If the second order of priority indicates a popularity associated with each of the at least one video, the video that has received the most user feedback or the most views may be first in the second order of priority. If the second order of priority indicates a date of creation associated with each of the at least one video, the video that has been created the most recently may be first in the second order of priority. If the second order of priority indicates a creator associated with each of the at least one video, the video created by a user that interacts most frequently with the user may be first in the second order of priority.

In response to receiving the indication to send information indicative of the at least one video associated with the music sample, at least one sample video image may be sent to the user device. At 708, at least one sample video image corresponding to a video among the at least one video may be sent to the user device. Each of the at least one sample video image may comprise a frame of a corresponding video among the at least one video. The frame may have been selected at the time of creation by the user that created the short video. Alternatively, the frame may have been selected by the short video service 114. For example, the short video service 114 may select a frame from a short video to be the sample video image if that frame may increase user interest in consuming the short video. In an embodiment, information indicative of the second order of priority may also be sent to the user device.

In one embodiment, the at least one video comprises a plurality of videos and the at least one sample video image comprises a plurality of sample video images. The user device may receive the plurality of sample video images and display the sample video images on an interface of the user device, such as in the array 302 depicted in FIG. 3 or in the carousel 402 depicted in FIG. 4. The plurality of sample video images may be displayed in the array or in the carousel in an order based on the second order of priority. For example, if a short video from which a sample video image was taken came first in the second order of priority, then that sample video image may be displayed first in the carousel or the array. If the plurality of sample video images are displayed in a carousel, the plurality of sample video images may be displayed while playback of the music sample corresponding to the image continues. The user associated with the user device may be able to traverse through the plurality of sample video images in the carousel while listening to the music sample. Viewing the sample video images while listening to the music sample may inspire the user to create a new short video featuring the music sample. In addition to inspiring creation, allowing the user to view the sample video images while listening to the music sample may improve using experiences of the users.

Figure 8:
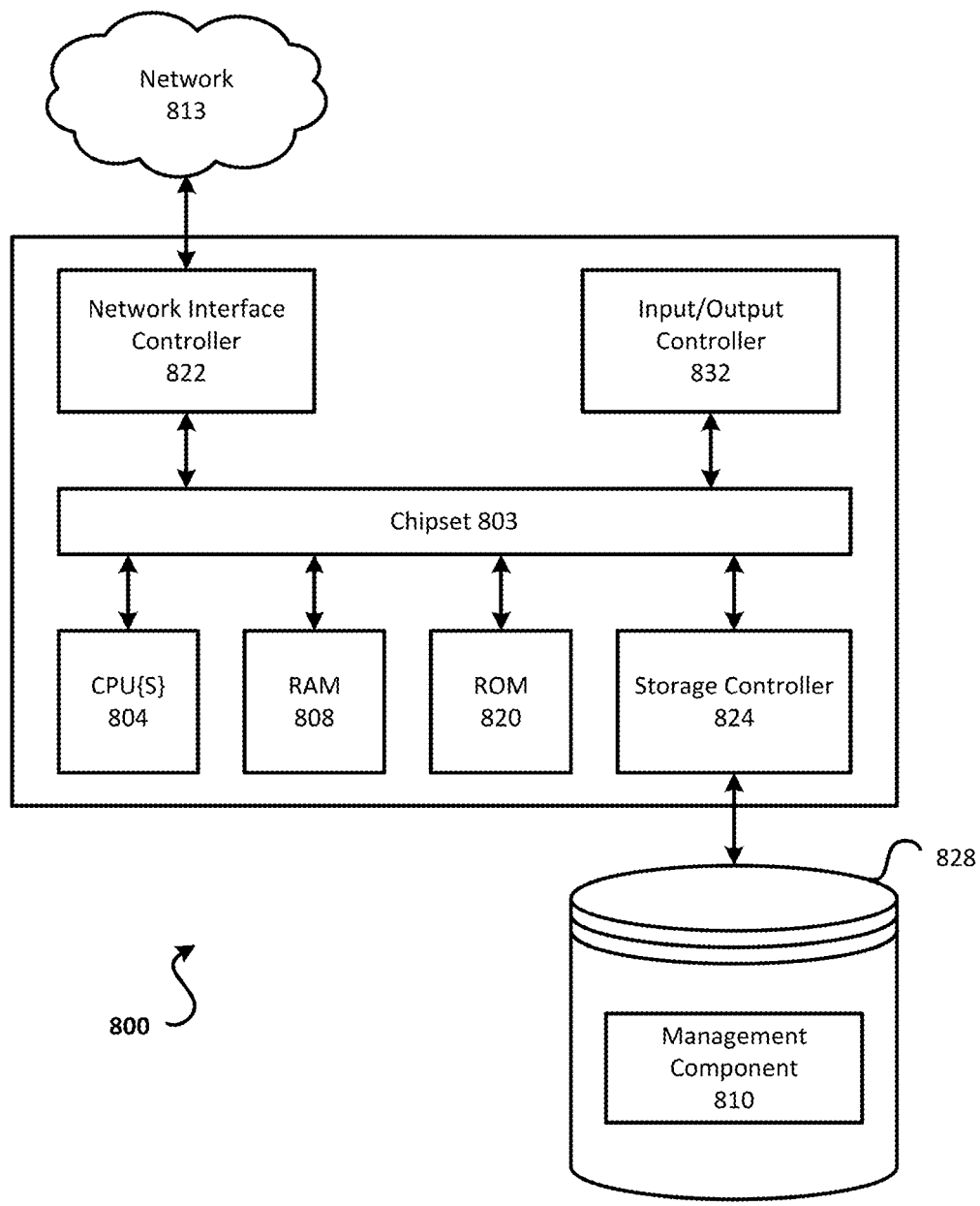
FIG. 8 shows an example computing device which may be used to perform any of the techniques disclosed herein.

FIG. 8 illustrates a computing device that may be used in various aspects, such as the services, networks, modules, and/or devices depicted in FIG. 1. With regard to the example architecture of FIG. 1, the short video service 114, cloud network 102, and client devices 130 may each be implemented by one or more instance of a computing device 800 of FIG. 8. The computer architecture shown in FIG. 8 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 800 may include a baseboard, or "motherboard," which is a printed circuit board to which a multitude of components or devices may be connected by way of a system bus or other electrical communication paths. One or more central processing units (CPUs) 804 may operate in conjunction with a chipset 806. The CPU(s) 804 may be standard programmable processors that perform arithmetic and logical operations necessary for the operation of the computing device 800.

The CPU(s) 804 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 804 may be augmented with or replaced by other processing units, such as GPU(s). The GPU(s) may comprise processing units specialized for but not necessarily limited to highly parallel computations, such as graphics and other visualization-related processing.

A chipset 806 may provide an interface between the CPU(s) 804 and the remainder of the components and devices on the baseboard. The chipset 806 may provide an interface to a random-access memory (RAM) 808 used as the main memory in the computing device 800. The chipset 806 may further provide an interface to a computer-readable storage medium, such as a read-only memory (ROM) 820 or non-volatile RAM (NVRAM) (not shown), for storing basic routines that may help to start up the computing device 800 and to transfer information between the various components and devices. ROM 820 or NVRAM may also store other software components necessary for the operation of the computing device 800 in accordance with the aspects described herein.

The computing device 800 may operate in a networked environment using logical connections to remote computing nodes and computer systems through local area network (LAN). The chipset 806 may include functionality for providing network connectivity through a network interface controller (NIC) 822, such as a gigabit Ethernet adapter. A NIC 822 may be capable of connecting the computing device 800 to other computing nodes over a network 816. It should be appreciated that multiple NICs 822 may be present in the computing device 800, connecting the computing device to other types of networks and remote computer systems.

The computing device 800 may be connected to a mass storage device 828 that provides non-volatile storage for the computer. The mass storage device 828 may store system programs, application programs, other program modules, and data, which have been described in greater detail herein. The mass storage device 828 may be connected to the computing device 800 through a storage controller 824 connected to the chipset 806. The mass storage device 828 may consist of one or more physical storage units. The mass storage device 828 may comprise a management component 810. A storage controller 824 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 800 may store data on the mass storage device 828 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 828 is characterized as primary or secondary storage and the like.

For example, the computing device 800 may store information to the mass storage device 828 by issuing instructions through a storage controller 824 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 800 may further read information from the mass storage device 828 by detecting the physical states or characteristics of one or more particular locations within the physical storage units.

In addition to the mass storage device 828 described above, the computing device 800 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 800.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 828 depicted in FIG. 8, may store an operating system utilized to control the operation of the computing device 800. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 828 may store other system or application programs and data utilized by the computing device 800.

The mass storage device 828 or other computer-readable storage media may also be encoded with computer-executable instructions, which, when loaded into the computing device 800, transforms the computing device from a general-purpose computing system into a special-purpose computer capable of implementing the aspects described herein. These computer-executable instructions transform the computing device 800 by specifying how the CPU(s) 804 transition between states, as described above. The computing device 800 may have access to computer-readable storage media storing computer-executable instructions, which, when executed by the computing device 800, may perform the methods described herein.

A computing device, such as the computing device 800 depicted in FIG. 8, may also include an input/output controller 832 for receiving and processing input from a number of input devices, such as a keyboard, a mouse, a touchpad, a touch screen, an electronic stylus, or other type of input device. Similarly, an input/output controller 832 may provide output to a display, such as a computer monitor, a flat-panel display, a digital projector, a printer, a plotter, or other type of output device. It will be appreciated that the computing device 800 may not include all of the components shown in FIG. 8, may include other components that are not explicitly shown in FIG. 8, or may utilize an architecture completely different than that shown in FIG. 8.

As described herein, a computing device may be a physical computing device, such as the computing device 800 of FIG. 8. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects.

Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method, comprising:
   receiving information indicative of a plurality of music samples sorted in a first order of priority;
   displaying, based on the information indicative of the plurality of music samples, a plurality of images in an order based on the first order of priority, wherein each of the plurality of images corresponds to a distinct one of the plurality of music samples;
   receiving a first user input indicative of a selection of a first image among the plurality of images, the first image corresponding to a first music sample among the plurality of music samples, wherein the receiving a first user input indicative of a selection of a first image comprises receiving an instruction to play the first music sample;
   receiving information indicative of a plurality of videos associated with the first music sample in response to the first user input indicative of the selection of the first image, wherein each of the plurality of videos features at least a portion of the first music sample; and
   displaying a plurality of sample video images based on the information indicative of the plurality of videos, wherein each of the plurality of sample video images corresponds to a distinct video among the plurality of videos associated with the first music sample, and wherein the displaying the plurality of sample video images comprises displaying the plurality of sample video images on a same page where the plurality of images corresponding to the plurality of music samples are displayed.

2. The method of claim 1, further comprising:
   playing the first music sample while displaying the of plurality of sample video images.

3. The method of claim 1, wherein the receiving information indicative of a plurality of videos comprises receiving information indicative of a second order of priority associated with the plurality of videos.

4. The method of claim 3, wherein the displaying the plurality of sample video images based on the information indicative of the plurality of videos comprises displaying the plurality of sample video images in an order based on the second order of priority.

5. The method of claim 1, wherein each of the plurality of sample video images comprises a frame of a corresponding video among the plurality of videos.

6. The method of claim 1, further comprising:
   receiving a second user input indicative of a selection of a second image among the plurality of images, the second image corresponding to a second music sample among the plurality of music samples; and
   displaying one or more sample video images associated with the second music sample while causing the plurality of sample video images associated with the first music sample to disappear.

7. A system, comprising:
   at least one database comprising a plurality of music samples and a plurality of images, wherein each of the plurality of images corresponds to a distinct one of the plurality of music samples; and
   at least one computing device in communication with the at least one database, the at least one computing device comprising at least one processor, and at least one memory communicatively coupled to the at least one processor and storing instructions that upon execution by the at least one processor cause the system to perform operations comprising:
   sorting, in a first order of priority, the plurality of music samples;
   sending, to a user device, information indicative of the plurality of images corresponding to the plurality of music samples and information indicative of the first order of priority for display of the plurality of images in an order based on the first order of priority on the user device;
   receiving, from the user device, an indication to send information indicative of a plurality of videos associated with a music sample among the plurality of music samples in response to a selection of the music sample, wherein the music sample is selected in response to receiving user input indicative of a selection of an image among the plurality of images that corresponds to the music sample, wherein the receiving user input indicative of a selection of an image comprises receiving an instruction to play the music sample, and wherein each of the plurality of videos features at least a portion of the music sample; and sending, to the user device, a plurality of sample video images for display of the plurality of sample video images on a same page where the plurality of images corresponding to the plurality of music samples are displayed, wherein each of the plurality of sample video images corresponds to a distinct video among the plurality of videos associated with the music sample.

8. The system of claim 7, wherein the receiving, from the user device, an indication to send the information indicative of a plurality of videos associated with an image comprises:

determining that playback of the music sample of the plurality of music samples that corresponds to the image has been initiated on the user device.

9. The system of claim 7, wherein the sorting, in the first order of priority, a plurality of music samples comprises:

determining a popularity associated with each of the plurality of music samples; and ranking, from a highest popularity to a lowest popularity, each of the plurality of music samples.

10. The system of claim 7, the operations further comprising:

sorting, in a second order of priority, the plurality of videos; and sending, to the user device, information indicative of the second order of priority.

11. The system of claim 10, wherein sorting, in the second order of priority, the plurality of videos comprises at least one of:

determining a time of creation associated with each of the plurality of videos;

determining a popularity associated with each of the plurality of videos; or determining a creator associated with each of the plurality of videos.

12. The system of claim 7, wherein each of the plurality of sample video images comprises a frame of a corresponding video among the plurality of videos.

13. A computing device, comprising:

at least one processor; and at least one memory communicatively coupled to the at least one processor and storing instructions that upon execution by the at least one processor cause the computing device to:

receive information indicative of a plurality of music samples sorted in a first order of priority;

display, based on the information indicative of the plurality of music samples, a plurality of images in an order based on the first order of priority, wherein each of the plurality of images corresponds to a distinct one of the plurality of music samples;

receive a first user input indicative of a selection of a first image of the plurality of images, the first image corresponding to a first music sample among the plurality of music samples, wherein receiving a first user input indicative of a selection of a first image comprises receiving an instruction to play the first music sample;

receive information indicative of a plurality of videos associated with the first music sample in response to the first user input indicative of the selection of the first image, wherein each of the plurality of videos features at least a portion of the first music sample; and display a plurality of sample video images based on the information indicative of the plurality of videos, wherein each of the plurality of sample video images corresponds to a distinct video among the plurality of videos associated with the first music sample, and wherein the displaying the plurality of sample video images comprises displaying the plurality of sample video images on a same page where the plurality of images corresponding to the plurality of music samples are displayed.

14. The computing device of claim 13, the at least one memory further storing instructions that upon execution by the at least one processor cause the computing device to:

play the first music sample while displaying the plurality of sample video images.

15. The computing device of claim 13, wherein the information indicative of the plurality of videos comprises a second order of priority associated with the plurality of videos, and wherein the plurality of sample video images are displayed in an order based on the second order of priority.

16. The computing device of claim 13, wherein each of the plurality of sample video images comprises a frame of a corresponding video among the plurality of videos.

17. The computing device of claim 13, the at least one memory further storing instructions that upon execution by the at least one processor cause the computing device to:

receive a second user input indicative of a selection of a second image among the plurality of images, the second image corresponding to a second music sample among the plurality of music samples; and display one or more sample video images associated with the second music sample while causing the plurality of sample video images associated with the first music sample to disappear.

* * * * *